Nov. 11, 1941.  J. KOLBE  2,262,289
CURVE COMPENSATION DEVICE FOR THE SUPERSTRUCTURE OF MOTOR VEHICLES
Filed Aug. 8, 1938  3 Sheets-Sheet 2
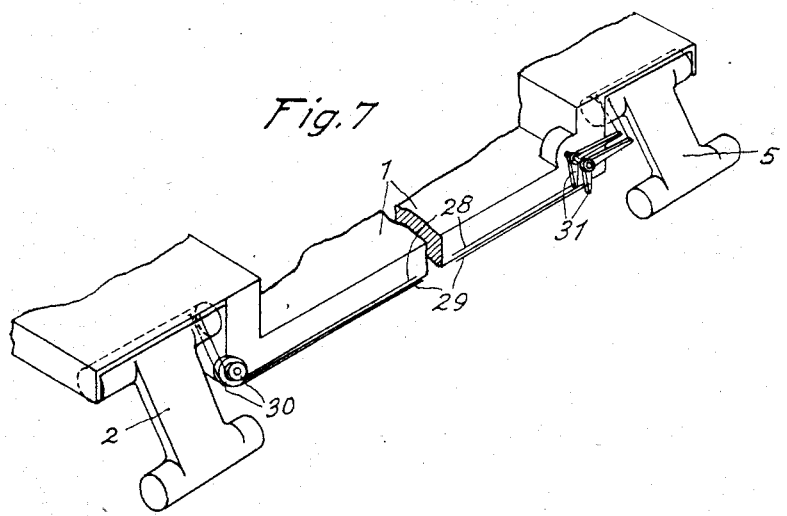
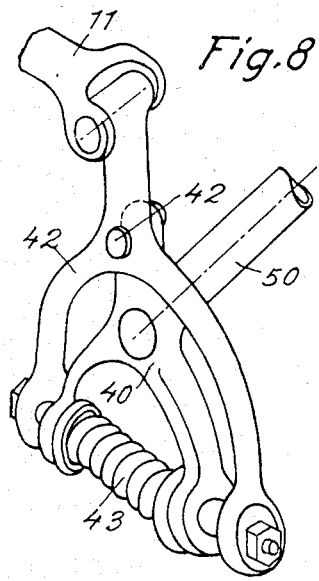
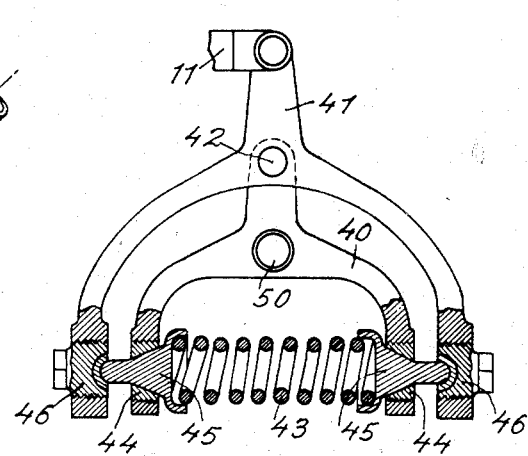
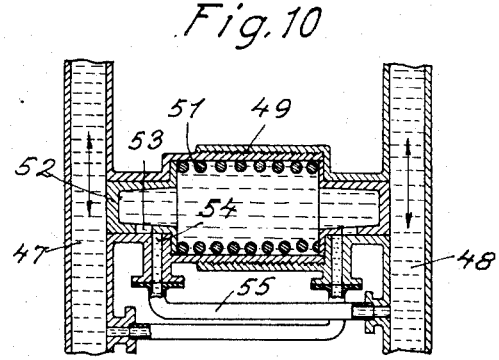
Inventor:
Joachim Kolbe
by
Bryant & Lowry
attys.

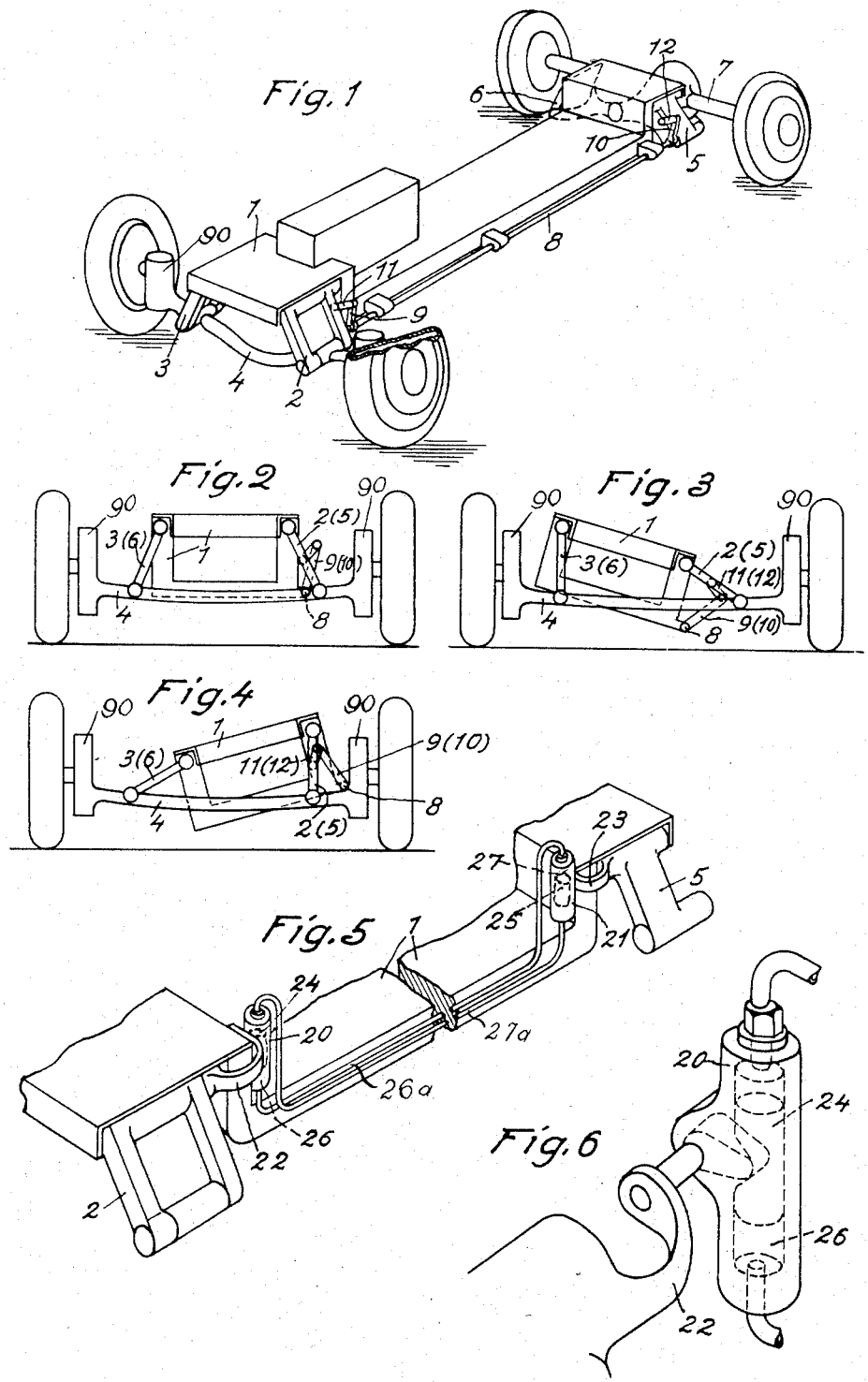

Nov. 11, 1941.  J. KOLBE  2,262,289
CURVE COMPENSATION DEVICE FOR THE SUPERSTRUCTURE OF MOTOR VEHICLES
Filed Aug. 8, 1938  3 Sheets-Sheet 3
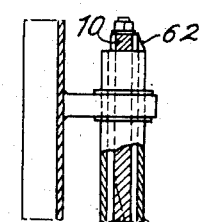
Fig.11ᵇ
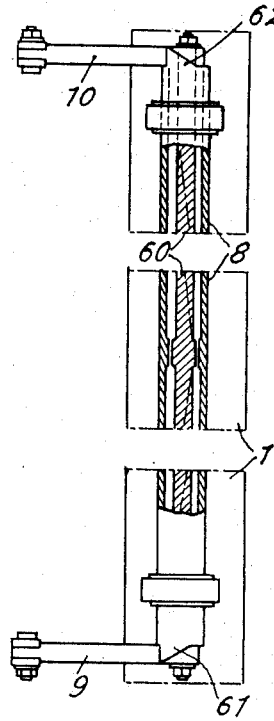
Fig.11ᵃ
Fig.11ᶜ
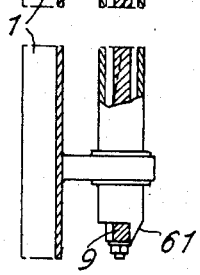
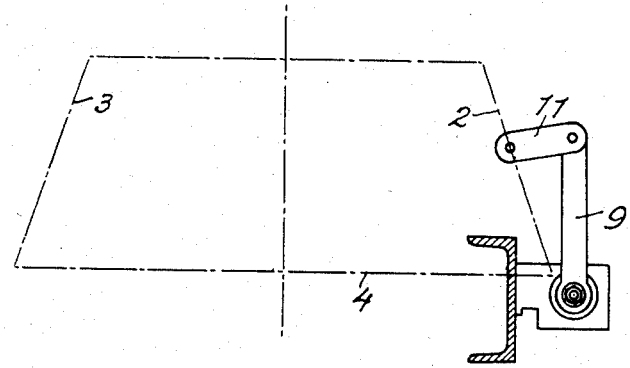
Inventor:
Joachim Kolbe

Patented Nov. 11, 1941

2,262,289

UNITED STATES PATENT OFFICE 2,262,289

CURVE COMPENSATION DEVICE FOR THE SUPERSTRUCTURE OF MOTOR VEHICLES

Joachim Kolbe, Hanover, Germany

Application August 8, 1938, Serial No. 223,743
In Germany August 12, 1937

9 Claims. (Cl. 280—112)

This invention relates to vehicles, and more particularly to vehicles of the type wherein the superstructure is so mounted on the wheel supporting means that it may move to an inclined or banked position when subjected to lateral forces such for example as centrifugal force developed as the vehicle rounds a curve. One of the advantages of such a structure is that the passengers in the vehicle will not be subjected to lateral thrust which urges them toward one side of the vehicle. In some such arrangements the superstructure is connected by suitable guiding elements only, with the wheel supporting means or axles of the vehicle, which themselves have no further interconnection. The guiding elements consists of inclined link members or curve guides. Through the absence of any direct connection (frame) between the axles, the latter are made capable of considerable mutually independent motion, so that such a vehicle can adapt itself excellently to any irregular surface, when travelling across country. For instance, the front axle may assume an inclined position in one direction and the rear axle the oppositely inclined position. If, owing to an inclination of the axles, caused by the uneven surface, an additional inclination of the vehicle body be brought about through the vehicle negotiating a curve, the two motions of axle and vehicle body have an additive effect. In such vehicles it is therefore necessary for there to be sufficient space between the wheels and the fenders for the swinging motion. The fenders must therefore be placed relatively high, to which must be added, that a certain space must also be available for the normal springing motion of the axles.

This large space between the wheels and fenders is in many cases undesired in the construction of body-work and it is therefore the object of the invention, to reduce the possibility of a great swinging motion of the two axles with respect to the superstructure, this being effected in such a manner that the inclined position of the vehicle body is completely maintained, when the vehicle is negotiating a curve. According to the invention the guiding elements of the front axle and rear axle are positively coupled in such a manner that they jointly perform equidirectional motions. The axles can no longer, as has hitherto been the case, adopt any positions which are quite independent of one another, but a motion of one axle imparts an impulse to the other axle for moving it in the same direction. Although the capability of such a vehicle to travel over rough country is somewhat reduced, this does not in practice play any great part, more particularly since in many cases, for instance in the case of ordinary passenger vehicles, no importance at all is attached to extreme adaptability for travelling over rough country.

According to the invention each guiding element is made to contribute to the securing of the other element, irrespective of whether a column or a transversely extending member is used as guiding element, the connecting joint being connected above the centre of gravity of the superstructure and the sprung wheels laterally to the column or transversely extending member, or whether the superstructure is supported by means of inclined simple link members or by means of rollers and guiding slots on the rigid or sprung axle or is suspended from it and so on.

The positive coupling of the guiding system as a whole thus becomes more rigid, so that it is no longer necessary in the case of the individual guides to attach so much importance to the rigidity of the individual system per se. This arrangement at the same time counteracts the danger of wobble. This is accomplished by a stabilizing means which is operably secured to the running gear at each end of the vehicle and to the superstructure.

The invention is illustrated by a number of constructional examples in the accompanying drawings, in which Fig. 1 is a perspective view of one constructional example, Figs. 2, 3, 4 show in three positions the manner in which the arrangement according to Fig. 1 functions.

Figs. 5 and 6 show a further constructional form with fluid pumps,

Fig. 7 shows a constructional form with Bowden wires,

Figs. 8 and 9 show an initial stressing device.

Figs. 10, 11a, 11b, 11c show further examples of an initial stressing device.

According to Fig. 1 the superstructure 1 of the vehicle, of which only the frame is shown, is supported at the front by means of the link members 2 and 3 on the wheel supporting means or axle 4 and at the rear by means of the link members 5 and 6 on the wheel supporting means or axle 7. The axles are constructed in a known manner as swinging or rocking axles. Resilient means such for example as coil springs may be interposed in housings 90 between the wheels and the superstructure 1 to absorb vertical shocks to which the wheels may be subjected.

On the superstructure 1 of the vehicle a tube 8 is rotatably journalled, which has at each end a lever 9 and 10 respectively. Both levers are pivotally connected by suspension means or shackles 11 and 12 with the link members 2 and 5. As shown in Fig. 2, which represents a view from the front, the two articulated trapeziums of the vehicle, which are formed by the link members, are one behind the other. On one link trapezium being displaced to the left (Fig. 3), the link member 2 will turn about its articulation on the vehicle body 1, and will at the same time through the suspension means 11 and the lever 9 also turn the tube 8. Through the lever 10 and the suspension means 12 the link member 5 and with it the whole of the rear link trapezium 5, 1, 6, 7 will be positively brought into the same position as the front trapezium 2, 1, 3, 4.

Fig. 4 shows the condition under centrifugal action from the left. While driving round a curve and also when driving along a road which is inclined transversely to the direction of travel (cambered road surface) the two link trapeziums would be displaced to the same side even without being intercoupled, so that the proposed coupling connection does not counteract the advantage obtained through the interposition of the link trapeziums.

Figs. 5 and 6 show in perspective the right-hand half of the vehicle with the link members 2 and 5. Fixed to the vehicle body 1 and lying close to the upper link pivots are the fluid containers 20 and 21. The rotary motion of the link members 2 and 5 is converted by way of the arms 22 and 23 into a sliding motion of the pistons 24 and 25. The space 26 below the piston 24 is connected by a tube 26a to the space 27 above the piston 25 and similarly the two other spaces above and below the pistons are interconnected by a tube 27a, so that the rotary motion of one link member and consequently of an entire link trapezium will also force the other link trapezium through the associated link member to perform a similar motion.

Fig. 7 shows the coupling connection of the link members 2 and 5 by means of two pull wires 28 and 29 which run over rollers 30 or are operably connected to bell cranks 31 carried by the vehicle superstructure or body and ensure that the link members will perform the rotary motion in the desired same sense, for the reason that each wire connection to one link member on one side of the axis of rotation is connected to the other link member on the other side. The wires may also be taken along the vehicle body at other places and other points of one link trapezium may also be connected with equi-positioned points of the other link trapezium (for instance the axles may be interconnected to induce them as well as the spaced links to move in unison laterally) by the pull wires or other motion transmitting means.

In the examples so far described a motion of one link trapezium corresponds exactly to the motion of the second trapezium, that is to say the forward guiding elements are coupled in such a manner with the rear guiding elements that they will together perform not only equidirectional motions but also motions of the same amount. In such a vehicle therefore one axle cannot be moved to a substantially different angular position than the other axle, so that the capacity to travel over rough roads is somewhat reduced. The corrections may however be made in such a manner that, in spite of the two guiding elements positioned for example at the front and rear being coupled, sufficient adaptability for travelling over rough roads will remain for all practical purposes. With this object in view initial stressing devices may be interposed in the described coupling arrangements. The coupling between the two guiding elements remains unaffected, so that, whilst the individual parts perform equidirectional motions as heretofore, owing to the initial stressing the motions will not be equally great.

In Fig. 8 such an initial stressing device is shown as applied to the coupling device described with reference to Fig. 1. The lever 9 of Fig. 1 consists in this case of the two parts 40 and 41 which are connected to one another rotatably at the pivot 42. Both parts terminate in forks at the same side. Between the limbs of the fork 40 is placed the strongly initially stressed compression spring 43. The extent of the initial stressing can be regulated by means of the nuts 44, in which rest the conical bearings 45 which at the same time act as abutments for the compression spring 43. The limbs of the fork 41, when, in the normal position, are in contact with the points of the conical pieces 45, projecting out of the regulating nuts 44, whilst further regulating nuts 46 are provided to take care of necessary adjustments. On the free end of the lever 41 being drawn to one side by the link member 2 through the suspension means 11, the lever 41 with the lever 40 and through their pivot 42 and the two forks with the entire initial stressing device will, the compression spring 43 being sufficiently initially stressed, turn about the center 50 of the tube 8 and this rotary motion will force the lever 10 by way of the suspension means 12 and the link 5 to move in the same direction and substantially the same amount as that performed by the link member 2. When however the link member 2 pulls at the lever 41 through the suspension means 11, whilst on the other side the link member 5 cannot take part in the same motion, for instance owing to resistance from the rough surface, the initial stressing pressure of the spring 43 will be overcome and the lever 41 will, acting with the fork end through the conical bearing 45, compress the spring 43 without the tube 8 being turned. One link trapezium is thus capable of a certain amount of displacement with respect to the vehicle superstructure or body 1, without the other being forced to take part in the same motion.

The initial stressing device can be interposed at any point of the tube 8, the tube being interrupted at this point and a fork-shaped lever being fixed to both tube ends, the device otherwise remaining the same as that described. Leaf springs, rubber and torsion springs may also be used. Finally the initial stressing may be provided in the interior of the fluid system according to Fig. 5, pistons yielding for instance to a pressure determined by the initial stressing of a spring or leaving a free space and the vacuum formed in the system being filled again by the displaced fluid itself.

Fig. 10 shows two pipe lines 47 and 48 which each interconnect the fluid containers mounted in Fig. 5 at the upper link member pivots and between the said pipes the casing 49 which contains the heavily initially stressed spring 51. On a sufficient pressure forming in one pipe line, for example 47, the piston 52 will be forced inwards. The opening 53 in its wall will then register with the opening 54 in the casing, so that the oil under pressure can escape through the pipe 55 into the second pipe line 48, where it equalises the vacuum formed.

Figs. 11a, 11b and 11c show a further initial stressing device employing a torsion bar. The tube frequently referred to (see Fig. 1) is mounted as previously on the vehicle body 1 so as to be capable of turning. The levers 9 and 10 are however fixed to the torsion bar 60 which is itself rigidly fixed in the middle of the tube 8. This torsion bar is, by being twisted, initially given a great spring tension which is held by extensions 61 and 62 on the tube 8, against which the levers 9 and 10 bear. The levers 9 and 10 can only work differently, when a greater force is applied to them than the force in the rotary bar. Both levers can however move unhindered in the same sense.

Through the described coupling arrangement in connection with the interposed initial stressing arrangement the vehicle fully retains the advantage of the inwardly directed inclined position of the vehicle body, while the vehicle is negotiating a curve, and also the advantage of the equalising horizontal position, when the vehicle is travelling over a surface which is inclined to the direction of travel, whilst being capable of travelling over rough roads, in so far as this is desirable for passenger vehicles. The vehicle however has a more usual appearance, as the fenders need not be placed excessively high.

I claim:

1. In a motor vehicle a superstructure, a running gear including front and rear wheel supported spindles, front and rear linkage means mounting said superstructure to said running gear, said linkage including elements disposed one to either side of the longitudinal axis of the vehicle and so constructed and arranged that as said vehicle negotiates a curve, external forces acting thereon will incline the superstructure toward the center of the curve relative to said running gear and will cause a lateral shifting thereof relative to said running gear, means carried by said superstructure connecting the rear linkage to the forward linkage whereby the front and rear sets of links are caused to move substantially in unison.

2. In a motor vehicle a superstructure, a running gear including front and rear supported spindles, front and rear linkage means mounting said superstructure to said running gear, said linkage including elements disposed one to either side of the longitudinal axis of the vehicle and so constructed and arranged that as the vehicle negotiates a curve, external forces acting thereon will incline the superstructure towards the center of the curve relative to said running gear and will cause a lateral shifting thereof relative to said running gear, means carried by said superstructure connecting the rear linkage to the forward linkage said means including a tube, whereby the front and rear sets of links are caused to move substantially in unison.

3. In a motor vehicle a superstructure, a running gear, including front and rear wheel supported spindles, front and rear linkage means mounting said superstructure on said running gear, said linkage including elements disposed one to either side of the longitudinal axis of the vehicle and so constructed and arranged that as said vehicle negotiates a curve, external forces acting thereon will incline the superstructure towards the center of the curve relative to said running gear and will cause a lateral shifting thereof relative to said running gear, and fluid pressure responsive means interconnecting the front and rear linkage means to induce them to move substantially in unison.

4. In a motor vehicle a superstructure, a running gear including front and rear wheel supported spindles, front and rear linkage means mounting said superstructure to said running gear, said linkage including elements disposed one to either side of the longitudinal axis of the vehicle and so constructed and arranged that as said vehicle negotiates a curve, external forces acting thereon will incline the superstructure towards the center of the curve relative to said running gear and will cause a lateral shifting thereof relative to said running gear, means carried by said superstructure connecting the rear linkage to the forward linkage said means including cables and cable supporting means, whereby the front and rear sets of links are caused to move substantially in unison.

5. In a motor vehicle a superstructure, a front running gear including wheel supported members, yielding means between said members and the wheels to absorb vertical shocks to which the wheels are subjected, linkage means mounting said superstructure to said wheel supported members, a rear running gear including wheel supported members, linkage means mounting said superstructure to said rear wheel supported members, said linkage means for both of said running gears including angularly inclined elements so constructed and arranged that as the vehicle negotiates a curve external forces acting thereon will cause the superstructure to incline toward the center of the curve relative to said wheel supported members and thereby produce a lateral shifting thereof on said linkage means toward the outside of the curve relative to said wheel supported members, and means carried by the superstructure operatively connecting said front and rear running gears and being so constructed and arranged that the front and rear linkage means are caused to move substantially in unison.

6. In a motor vehicle a superstructure, a front running gear including wheel supported members, linkage means mounting the superstructure to the wheel supported members, a rear running gear including wheel supported members, linkage means mounting the superstructure to the rear wheel supported members, said linkage means for both of said running gears being so constructed and arranged that as the vehicle negotiates a curve external forces acting thereon will cause the superstructure to incline toward the center of the curve relative to said wheel supported members and thereby produce a lateral shifting thereof on said linkage means toward the outside of the curve relative to said wheel supported members, and stabilizing means carried by the superstructure operably interconnecting said superstructure and said front and rear linkage means whereby all portions of the superstructure are caused to move laterally to the same degree substantially in unison relative to the front and rear wheel supported members.

7. A device as specified in claim 6 wherein the superstructure carried means operably interconnecting the front and rear linkage means includes a tube.

8. A device as specified in claim 6 wherein the superstructure carried means operably interconnecting the front and rear linkage means includes fluid pressure responsive means.

9. A device as specified in claim 6 wherein the superstructure carried means operably interconnecting the front and rear linkage means includes cables and cable supporting means.

JOACHIM KOLBE.